Oct. 22, 1935.  J. C. RUMSEY  2,018,381
JOCKEY WAGON
Filed Dec. 14, 1933
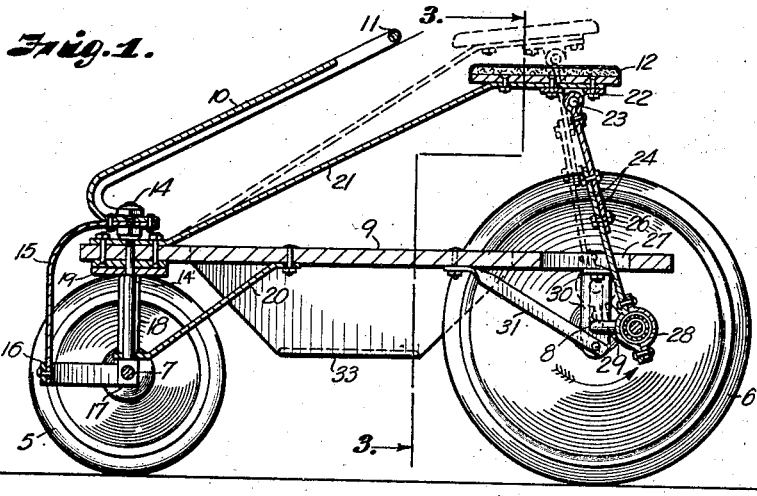
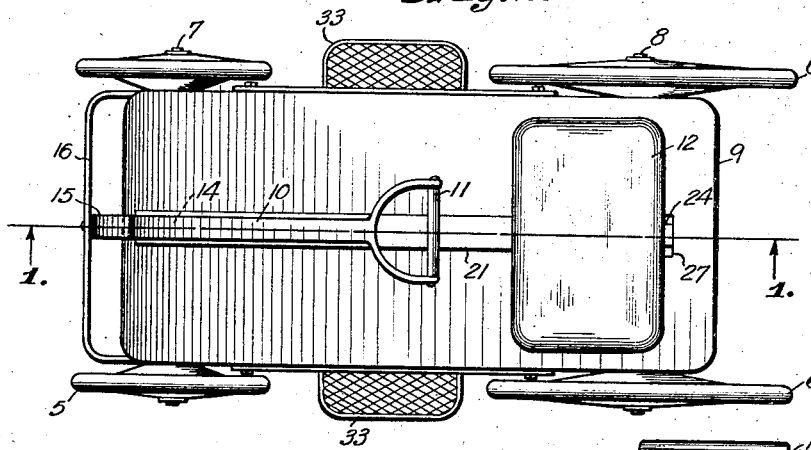
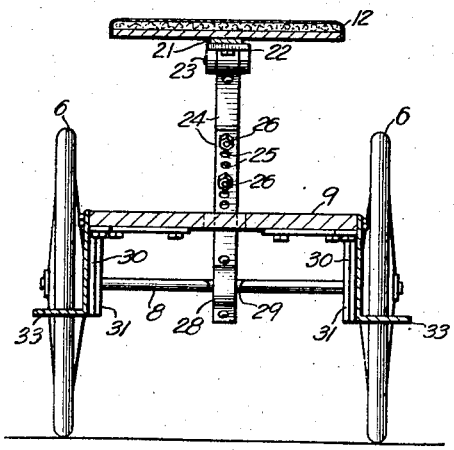
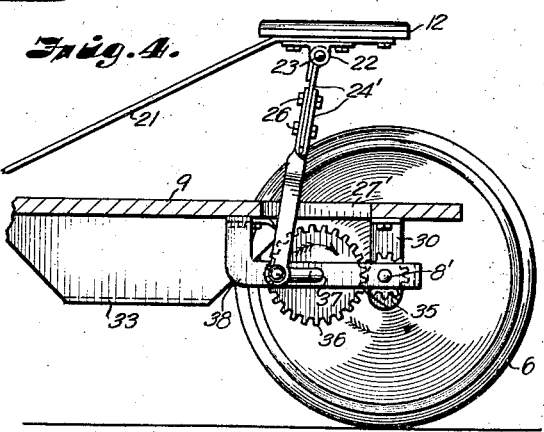
INVENTOR:
John C. Rumsey,
BY Chas. W. Gerard,
ATTORNEY.

Patented Oct. 22, 1935

2,018,381

UNITED STATES PATENT OFFICE 2,018,381

JOCKEY WAGON

John C. Rumsey, Lawrence, Kans.

Application December 14, 1933, Serial No. 702,285

1 Claim. (Cl. 268—34)

The present invention relates to toy vehicles, and the primary object in view is to devise a child's wagon in which the novelty consists in providing means whereby the rider may propel the wagon by movements of his body simulating those of a jockey riding a horse.

For this purpose I provide a construction in which a yielding seat is provided for the rider, and the movements of said seat are transmitted through suitable connections to one of the axles of the wagon for propelling the same.

In carrying out the construction, the same takes the form of a wagon having suitable steering means for the front wheels, while the axle of the rear wheels is provided with driving connections to a yieldingly supporting seat, whereby movements of the rider simulating those of a jockey will operate the driving connections to propel the wagon. Preferably, suitable adjusting means are also provided in the connections to the drive axle for varying the pull of the spring.

With the foregoing general objects in view, the invention will now be described by reference to the accompanying drawing illustrating suitable forms of embodiment of the proposed improvements, after which those features and combinations deemed to be novel will be particularly set forth and claimed.

In the drawing—

Figure 1 is a vertical sectional elevation illustrating a jockey wagon constructed in accordance with the present invention, said view representing a section taken on the line 1—1 of Figure 2;

Figure 2 is a plan view of the same;

Figure 3 is a vertical section view, representing a section taken on the line 3—3 of Figure 1; and Figure 4 is a vertical sectional view of the rear end portion of a wagon showing a modified form of construction.

Referring now to the drawing in detail, the improved construction is illustrated as comprising a pair of front steering wheels 5 and a pair of rear propelling wheels 6 journaled on axles 7 and 8, respectively, beneath the front and rear end portions of a suitable platform 9. Any practical form of steering means may be provided for the front wheels 7, such as a rearwardly projecting arm 10 having a handle 11 adjacent to the rider's seat 12, the forward end of said arm being supported on the upper end of a post 14 at the front end of the wagon, where said arm 10 is attached by means of an elbow 15 to a yoke 16 connecting opposite ends of the axle 7; this axle in turn is supported in a bearing 17 carried by the lower end of the vertical post 14 and suitably anchored by means of a bracket arm 20 attached to the under face of the platform 9, as well as by lateral braces 18 connecting with a plate 19 supported on the shoulder 14' of the bolt 14, all as clearly illustrated in Figure 1. The parts 15 and 16 of this construction thus provide a bumper arrangement at the front end of the wagon.

The seat 12 is secured to the free rear end of a relatively stiff supporting spring 21, the forward end of which is secured to the front end of the platform 9, with the spring extending at an upward slope towards the rear in position to support the seat 12 a suitable distance above the rear end portion of said platform, as represented in Figure 1. To the under face of the seat 12 is attached a bracket 22 providing a hinge pin 23 for pivotal attachment to the operating connections for the rear axle 8, said connections comprising a pair of links 24 having a series of openings 25 for adjustable connection by means of bolts 26. The lower link 24 extends through an opening 27 in the platform 9 and at its lower end is provided with a ball bearing connection 28 with a crank arm 29 at the middle portion of the rear axle 8, the latter being journaled in brackets 30 depending from the under face of the platform 9 and suitably braced by arms 31.

A step or foot rest 33 is provided at each side of the platform 9 between the front and rear wheels, at a proper height for the support of the feet of the rider and enabling him to relieve the seat 12 of his weight in the upward movement of the seat, as indicated by the dotted lines in Figure 1.

In the operation of the construction for propelling the wagon, the rider takes his position on the seat 12 with his feet resting on the steps 33, and rolls the wagon until the crank 28 is forward past center, when his weight will rotate the axle and propel the wagon forwardly. On movement of the crank rearwardly past center, the rider throws his weight forward as much as necessary to relieve the seat of his weight (supporting himself by means of the steps 33), whereupon the action of the spring 21, combined with the momentum of the wagon, will continue to propel it forward until the crank is again in forward position past center, when the rider returns his weight to the seat for continuing the propelling action against the spring tension, as before. Thus the movements of the rider simulate those of a jockey during the forward movement of the wagon.

The modification illustrated in Figure 4 utilizes suitable gearing for stepping up the speed of propulsion for a given rate of propelling action as transmitted from the seat. This gearing comprises a pinion 35 on the axle 8', driven by a gear wheel 36 secured to a crankshaft 37 mounted in a bearing structure 38 and operated by the connections 24' from the seat 12; the opening 27' for said links 24' is located sufficiently forward of the axle 8' for the purpose. It will be understood that the operation is substantially the same as before, excepting that the crank is simply positioned for starting the forward propulsion by backward rotation of the gear wheel 36, as indicated by the arrow in said Figure 4.

It will therefore be apparent that I have devised a practical and unique toy device for the accomplishment of the desired purposes of my invention, in which the child can efficiently propel the vehicle by an up and down movement upon the seat 12, in a manner simulating the well known movement of a jockey, and that the same is well adapted to furnish both amusement and healthful exercise for the rider. It may also be noted that the tension of the spring 21 may be readily adjusted by appropriate manipulations of the bolts 26 for regulating the length of the connection between the seat and crank, as may be desired according to the weight of the rider.

While the foregoing illustrates and describes what is now regarded as a practical and efficient form of construction for the embodiment of the proposed improvements, I desire to be understood as reserving the right to make whatever changes or modifications may fairly fall within the scope of the appended claim.

Having described my invention, what I claim to be new and desire to secure by Letters Patent is:

A jockey wagon comprising a platform provided with propelling wheels, a stiff supporting spring secured to the front end of said platform and projecting rearwardly in upwardly inclined position, a seat carried by the free rear end of said spring, and operating connections from said seat for transmitting a propelling action to said wheels, said operating connections comprising relatively adjustable elements for varying the height of said seat as well as correspondingly adjusting the tension of said supporting spring.

JOHN C. RUMSEY.